(12) United States Patent
Li et al.

(10) Patent No.: US 12,290,221 B2
(45) Date of Patent: May 6, 2025

(54) CLEANING SYSTEMS AND SELF-CLEANING METHODS FOR CLEANING DEVICES

(71) Applicant: KINGCLEAN ELECTRIC CO., LTD., Jiangsu (CN)

(72) Inventors: Na Li, Suzhou (CN); Zhimin Wu, Suzhou (CN); Jingyuan Fu, Suzhou (CN)

(73) Assignee: KINGCLEAN ELECTRIC CO., LTD., Suzhou (CN)

( * ) Notice: Subject to any disclaimer, the term of this patent is extended or adjusted under 35 U.S.C. 154(b) by 0 days.

(21) Appl. No.: 18/589,402

(22) Filed: Feb. 27, 2024

(65) Prior Publication Data
US 2024/0197136 A1    Jun. 20, 2024

Related U.S. Application Data

(63) Continuation-in-part of application No. PCT/CN2022/134267, filed on Nov. 25, 2022.

(30) Foreign Application Priority Data

Mar. 23, 2022 (CN) .......................... 202210288804.0

(51) Int. Cl.
*A47L 11/40* (2006.01)

(52) U.S. Cl.
CPC ....... *A47L 11/4091* (2013.01); *A47L 11/4005* (2013.01); *A47L 11/4011* (2013.01); *A47L 11/4083* (2013.01)

(58) Field of Classification Search
CPC .... A47L 9/2868; A47L 9/2836; A47L 9/2873; A47L 2201/026; A47L 11/4094; A47L 11/4091; A47L 11/4083; A47L 11/4005
See application file for complete search history.

(56) References Cited

U.S. PATENT DOCUMENTS 11,071,428 B2 * 7/2021 Resch ................... A47L 9/2873
2018/0235423 A1    8/2018 Huang
(Continued)

FOREIGN PATENT DOCUMENTS

| CN | 111870191 A | 11/2020 |
|----|-------------|---------|
| CN | 211933874 U | 11/2020 |

(Continued)

OTHER PUBLICATIONS

International Search Report in PCT/CN2022/134267 mailed on Feb. 20, 2023, 7 pages.
(Continued)

*Primary Examiner* — Edward F Landrum
*Assistant Examiner* — Sarah Akyaa Fordjour
(74) *Attorney, Agent, or Firm* — PORUS IP LLC

(57) ABSTRACT

The embodiment of the present disclosure provides a cleaning system and a self-cleaning method for a cleaning device. The cleaning system includes a cleaning device and a base station, wherein when docked with the cleaning device, the base station is used to control the cleaning device for self-cleaning and charging a rechargeable battery; a trigger control part, used to activate a self-cleaning mode; and a control module configured to: activate the self-cleaning mode and control a battery charging circuit to fail after receiving a trigger signal; in response to monitoring a first predetermined state, controlling the battery charging circuit to be effective to charge the rechargeable battery; in response to monitoring a second predetermined state, control the battery charging circuit to fail, and continue to execute the self-cleaning mode to clean the cleaning part, then exit the self-cleaning mode until a self-cleaning completion condition is met.

16 Claims, 7 Drawing Sheets

(56) References Cited

U.S. PATENT DOCUMENTS

| | | | |
|---|---|---|---|
| 2021/0244253 A1* | 8/2021 | Miller | A47L 11/34 |
| 2022/0287538 A1 | 9/2022 | Zheng | |
| 2022/0338702 A1* | 10/2022 | Wang | A47L 11/282 |
| 2024/0197133 A1* | 6/2024 | Huang | A47L 11/4041 |

FOREIGN PATENT DOCUMENTS

| | | |
|---|---|---|
| CN | 112515577 A | 3/2021 |
| CN | 113303727 A | 8/2021 |
| CN | 113558539 A | 10/2021 |
| CN | 113786138 A | 12/2021 |
| CN | 114052555 A | 2/2022 |
| CN | 114073458 A | 2/2022 |
| CN | 114766990 A | 7/2022 |

OTHER PUBLICATIONS

Written Opinion in PCT/CN2022/134267 mailed on Feb. 20, 2023, 8 pages.
Decision to Grant a Patent in Chinese Application No. 202210288804.0 mailed on Apr. 18, 2023, 3 pages.

* cited by examiner

CLEANING SYSTEMS AND SELF-CLEANING METHODS FOR CLEANING DEVICES

CROSS REFERENCE TO RELATED APPLICATIONS

The present disclosure is a continuation-in-part of International Patent Application No. PCT/CN2022/134267, filed on Nov. 25, 2022, which claims priority to Chinese Patent Application No. 202210288804.0, filed on Mar. 23, 2022, the entire contents of each of which are hereby incorporated by reference.

TECHNICAL FIELD

The present disclosure relates to the technical field of household appliances, and in particular, to a cleaning system and a self-cleaning method for a cleaning device.

BACKGROUND

With the development of society and the continuous improvement of people's living standards, people's requirements for living environments are becoming increasingly higher. The application of intelligent technology and comfort in cleaning devices and floor washing machines is also becoming more and more common.

Cleaning devices currently on the market, such as floor washing machines, need to meet certain conditions in order to activate the self-cleaning mode. These conditions include sufficient battery power, a proper water level in the clean water tank, and a proper water level in the sewage tank. Typically, users are required to add water to the clean water tank, clean the sewage tank, and ensure that the rechargeable battery of the cleaning device is sufficiently charged before starting the self-cleaning mode. If the battery power is low (i.e. not sufficient for the self-cleaning mode) or if other conditions are not met, the user cannot activate the cleaning mode. Additionally, once the cleaning device is sufficiently charged, users are required to manually press a button to initiate the self-cleaning mode, which is inconvenient for the user. This waiting time for charging often results in dirt and grime accumulating on the cleaning parts, making it difficult to clean and resulting in unpleasant odors. In some cases, users may forget to manually activate the self-cleaning mode even when the charging is complete or when the battery power reaches the required level, causing the cleaning device to emit an unpleasant odor. Furthermore, even after the self-cleaning mode is completed, users still need to clean the sewage tank separately, resulting in the need to clean the tank twice. All of these factors contribute to a poor user experience.

Therefore, it is desired to propose a cleaning system and a self-cleaning method for a cleaning device that is more convenient and highly automated.

SUMMARY

The present disclosure provides a cleaning system, including a cleaning device and a base station, wherein: the base station, when docked with the cleaning device, is used to control the cleaning device for self-cleaning and charging a rechargeable battery; the cleaning device includes: a clean water tank, for storing a cleaning liquid; a water pump, provided on a liquid supply path for pumping the cleaning liquid of the clean water tank out; a sewage tank, for storing dirt; a suction drive module, for providing a suction force for sucking the dirt into the sewage tank; the rechargeable battery, for powering the water pump as well as the suction drive module; a battery charging circuit, electrically connected to the rechargeable battery for controlling recharging of the rechargeable battery; and a cleaning part, for cleaning an object to be cleaned; the cleaning system further comprises a trigger control part and a control module, wherein the trigger control part is configured for activating a self-cleaning mode; and the control module is configured for: activating the self-cleaning mode and controlling the battery charging circuit to fail after receiving a trigger signal from the trigger control part; in response to monitoring a first predetermined state, controlling the battery charging circuit to be effective to charge the rechargeable battery during executing the self-cleaning mode to clean the cleaning part; in response to monitoring a second predetermined state after monitoring the first predetermined state, controlling the battery charging circuit to fail, continuing to execute the self-cleaning mode to clean the cleaning part, and exiting the self-cleaning mode until a self-cleaning completion condition is met; and wherein the self-cleaning mode includes: M times of a sub-self-cleaning mode; the control module is configured to execute the M times of the sub-self-cleaning mode; M being an integer greater than or equal to 1.

The present disclosure provides a self-cleaning method for a cleaning device. The cleaning device includes a cleaning part, a clean water tank, a water pump, a sewage tank, a suction drive module, a rechargeable battery, and a battery charging circuit, and the cleaning part is configured for cleaning an object to be cleaned; the clean water tank is used to store a cleaning liquid; the water pump is provided on a liquid supply path for pumping the cleaning liquid of the clean water tank out; the sewage tank is used to store dirt; the suction drive module is configured to provide a suction force for sucking the dirt into the sewage tank; the rechargeable battery is used to power the water pump and the suction drive module; and the battery charging circuit is electrically connected to the rechargeable battery for controlling recharging of the rechargeable battery; the base station is used to control the cleaning device for self-cleaning and charging the rechargeable battery when the cleaning device is docked with the base station; and the self-cleaning method includes: activating a self-cleaning mode and controlling the battery charging circuit to fail after receiving a trigger signal from a trigger control part; in response to monitoring a first predetermined state, controlling the battery charging circuit to be effective to charge the rechargeable battery during executing the self-cleaning mode to clean the cleaning part; and in response to monitoring a second predetermined state after monitoring the first predetermined state, controlling the battery charging circuit to fail, continuing to execute the self-cleaning mode to clean the cleaning part, and exiting the self-cleaning mode until a self-cleaning completion condition is met.

The present disclosure further provides a computer device, including a memory and a processor, the memory stores a computer program, and when the processor executes the computer program, a self-cleaning method for a cleaning device is implemented.

The present disclosure further provides a non-transitory computer-readable storage medium, on which a computer program is stored, and when the computer program is executed by a processor, a self-cleaning method for a cleaning device is realized.

The cleaning system and self-cleaning method for the cleaning device can directly execute the self-cleaning mode when a user activates the self-cleaning mode without meeting conditions such as adding water to the clean water tank and cleaning the sewage tank, and a remaining power of the rechargeable battery is enough to execute the self-cleaning mode entirely. This setting effectively avoids a situation that the cleaning device becomes smelly due to the user forgetting to activate the self-cleaning mode again, and also avoids a cumbersome operation that requires the user to trigger the self-cleaning button multiple times, henceforth effectively improving the user experience. When executing the self-cleaning mode, if the amount of sewage in the sewage tank is small, the user only needs to clean the sewage tank after the self-cleaning mode is completed, reducing a count of times of cleaning. When executing the self-cleaning mode, if there is a lot of water in the clean water tank, there is no need to add water to the clean water tank during the self-cleaning mode, reducing a count of times of adding water. When the remaining power of the rechargeable battery does not reach a power required to complete the self-cleaning mode entirely, the self-cleaning mode can also be activated, and the battery can be charged during a self-cleaning process. This setting can ensure that the cleaning device will be recharged when the battery is low after executing self-cleaning for a time period, so as to avoid a problem that dirt stays in the cleaning part and the sewage tank for a long time due to insufficient battery and long-term charging, which makes it difficult to clean up later or takes longer to clean.

DETAILED DESCRIPTION

The drawings that need to be used in the description of the embodiments will be briefly introduced below. The drawings do not represent all embodiments.

As used herein, "system", "device", "unit", and/or "module" is a method used to distinguish different components, elements, parts, sections, or assemblies of different classes. However, the words may be replaced by other expressions if other words can achieve the same purpose.

The words "a", "an", "one" and/or "the" are not intended to refer to the singular and may include the plural unless the context clearly indicates an exception. Generally speaking, the terms "comprising" and "including" only suggest the inclusion of clearly identified steps and elements, and these steps and elements do not constitute an exclusive list, and the method or device may also contain other steps or elements.

Some embodiments of the present disclosure provide a cleaning system, including: a cleaning device and a base station. In some embodiments, when docked with the cleaning device, the base station may be configured for the cleaning device to execute self-cleaning and charge a rechargeable battery of the cleaning device.

Figure 1:
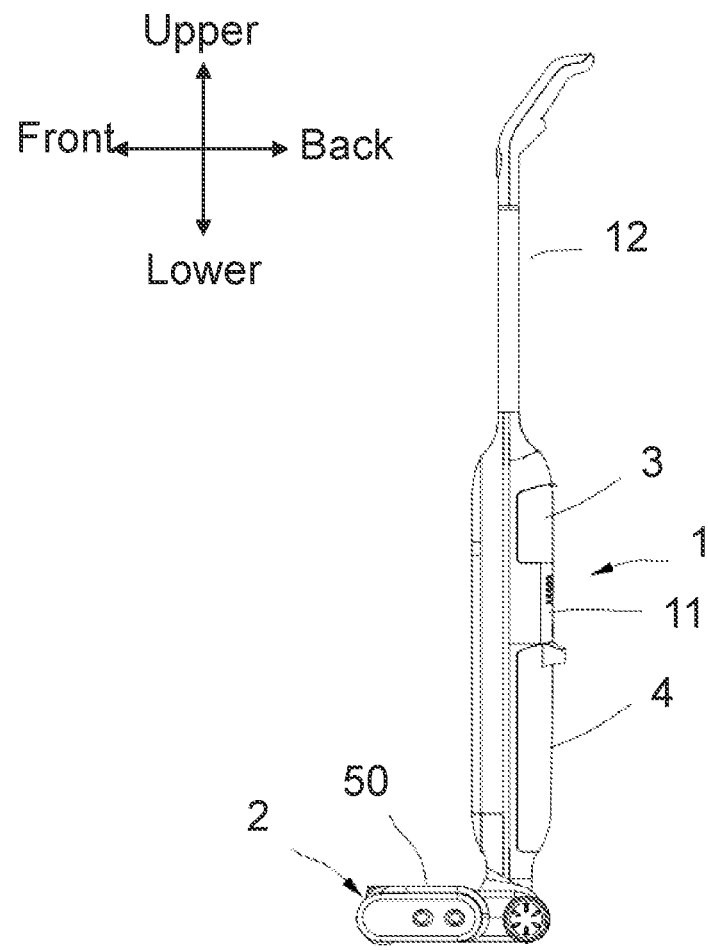
FIG. 1 is a schematic diagram illustrating an exemplary structure of a cleaning device according to some embodiments of the present disclosure.
Figure 2:
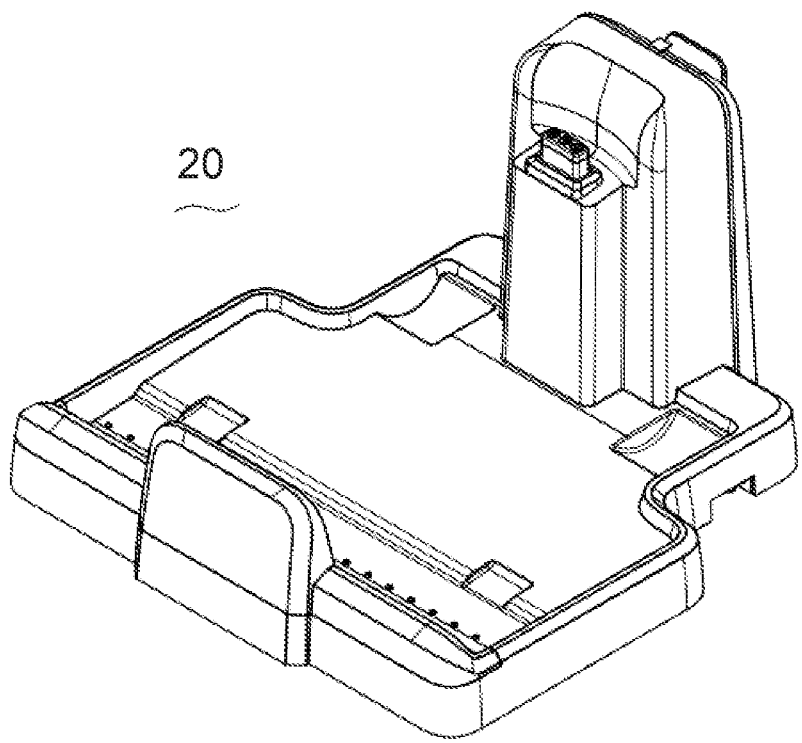
FIG. 2 is a schematic diagram illustrating an exemplary structure of a base station according to some embodiments of the present disclosure.

FIG. 1 is a schematic diagram illustrating an exemplary structure of a cleaning device according to some embodiments of the present disclosure; and FIG. 2 is a schematic diagram illustrating an exemplary structure of a base station according to some embodiments of the present disclosure. Some of the following embodiments can be understood with reference to FIG. 1 and FIG. 2, but the drawings are only schematic representations of some of the implementations and do not constitute limitations to the implementations.

As shown in FIG. 1, the cleaning device includes a body 1, a rechargeable battery 3, a handle body 12, a cleaning liquid supply assembly, a sewage tank 4, a ground brush assembly 2, a housing 11, a suction drive module, and a battery charging circuit.

The cleaning liquid supply assembly includes a clean water tank 50 and a cleaning liquid injection module (not shown in FIG. 1). The clean water tank 50 is configured for storing a cleaning liquid.

In some embodiments, the cleaning device includes a water pump. The water pump is provided on a liquid supply path for pumping the cleaning liquid out in the clean water tank 50.

The handle body 12 is provided on an upper end of the body 1, the ground brush assembly 2 is rotatably provided on a lower end of the body 1, and the clean water tank 50 is detachably provided on the ground brush assembly 2. The cleaning liquid stored in the clean water tank 50 may be pumped out by the action of the water pump and injected into the ground brush assembly 2 through the cleaning liquid injection module. The ground brush assembly 2 includes a cleaning part, which is used to clean an object to be cleaned, and the cleaning liquid pumped out by the water pump acts on the cleaning part.

The suction drive module is provided inside the housing 11 of the body 1. The suction drive module is configured to provide a suction force to suck dirt into the sewage tank 4. Both the sewage tank 4 and the rechargeable battery 3 are independently and detachably provided on a rear of the body 1, and the sewage tank 4 is provided under the rechargeable battery 3. The sewage tank 4 is configured for storing dirt. The rechargeable battery 3 is used to supply power to the water pump and the suction drive module. The battery charging circuit is electrically connected to the rechargeable battery 3, and the battery charging circuit is used to control recharging of the rechargeable battery 3.

The above-mentioned cleaning device may specifically be a floor washing machine.

In some embodiments, the suction drive module is configured to provide a suction force to dispose of ground waste. For example, the suction drive module may be a suction motor. During a cleaning process, under a suction force of the suction drive module, a mixed fluid of gas, dust, and/or liquid passes through a suction port of the ground brush assembly 2, flows through a fluid channel in the ground brush assembly 2 and the body 1, and enters the sewage tank 4, and separation of the gas, dust, and/or liquid is carried out under the action of the suction drive module. The dust and/or liquid are stored in the sewage tank 4, and separated gas enters the suction drive module from an upper part of the sewage tank 4 and is discharged from an air outlet of the suction drive module.

The above-mentioned fluid may be a clean airflow, or an airflow entrained with garbage; and the garbage may be at least one of dust, solid garbage (e.g., cigarette butts, paper pieces, rice grains, or the like), or a dirty liquid (e.g., orange juice, dirty water, an egg liquid, or the like).

In some embodiments, the cleaning liquid injection module includes a nozzle and the water pump, the water pump is used to transmit the cleaning liquid from the clean water tank 50 to the nozzle, and the nozzle is used as an output end of the cleaning liquid supply assembly to inject the cleaning liquid to the cleaning part (for example, a rolling brush) or a floor, then the cleaning part may roll and wipe the floor to clean and/or care the floor. Optionally, the cleaning liquid may be clear water, or cleaning agent, care agent, or the like.

The base station 20 is configured for adapting to the cleaning device, and when docked with the cleaning device, the base station 20 is configured for the cleaning device to execute self-cleaning and charge the rechargeable battery 3. When the cleaning device is assembled on the base station 20, the cleaning liquid injected by the nozzle may act on the cleaning part, so that the cleaning part may rotate for self-cleaning.

In some embodiments, the cleaning system further includes a trigger control part and a control module.

The trigger control part is used to activate a self-cleaning mode. In some embodiments, the trigger control part may be provided on the cleaning device and may also be on the base station 20. Preferably, the trigger control part may be provided on the cleaning device.

In some embodiments, the control module may be provided on the cleaning device. In some embodiments, the control module may also be provided on the base station 20.

In some embodiments, the control module is configured to: activate the self-cleaning mode and control the battery charging circuit to fail after receiving a trigger signal from the trigger control part. When the battery charging circuit is failed, the base station 20 is failed to charge the rechargeable battery 3.

The trigger control part may send the trigger signal to the control module under a user's operation. For example, the user may interact with the trigger control part by touching, pressing, etc., so as to send the trigger signal to the control module.

In this embodiment, when the user activates the self-cleaning mode through the trigger control part, the control module may activate the self-cleaning mode, and there is no need to add water to the clean water tank 50 and clean the sewage tank 4, and when a remaining power of the rechargeable battery 3 is higher than a power threshold (which is a power required to execute the self-cleaning mode entirely), the self-cleaning mode may be executed. This method can effectively avoid a situation that the cleaning device becomes smelly when the user forgets to activate the self-cleaning mode, reducing a cumbersome operation of the user to trigger a self-cleaning button multiple times and improving user experience. At the same time, when the self-cleaning mode is executed, if the clean water tank 50 has a large amount of water, there is no need to add water to the clean water tank 50, which can reduce a count of times of adding water. When the remaining power of the rechargeable battery 3 does not reach a required power for executing the self-cleaning mode entirely, the self-cleaning mode may be turned on. During a self-cleaning process, the cleaning device may be charged, that is, the cleaning device may execute self-cleaning for a time period when the battery is low, and then enter a charging state. It can avoid a problem that the dirt stays in the cleaning part and the sewage tank 4 for a long time due to insufficient power and long-term charging, which is difficult to clean up or takes longer to clean.

In some embodiments, the self-cleaning mode includes M times of sub-self-cleaning; and the control module is configured to execute the M times of sub-self-cleaning. In the sub-self-cleaning mode, the nozzle of the cleaning liquid injection module may inject the cleaning liquid on the cleaning part, so that the cleaning part may rotate for self-cleaning. In the sub-self-cleaning mode, the suction drive module may suck dirt from the cleaning part into the sewage tank. When the suction drive module stops operation, current execution times of the sub-self-cleaning mode are recorded, that is, one time of sub-self-cleaning is completed.

Usually, in order to ensure the cleaning effect, M is an integer greater than or equal to 1. Exemplarily, M may be 1, 2 or 3. Times of sub-self-cleaning are only for illustration and do not constitute a limitation to the embodiment.

In some embodiments, M may be preset by the cleaning device in advance. In some embodiments, M may be determined according to the remaining power of the rechargeable battery 3. In some embodiments, M may be determined according to the remaining power of the rechargeable battery 3 and a dirt degree of the cleaning part.

In some embodiments, the control module executes the M times of sub-self-cleaning, that is, cycles M times of the sub-self-cleaning mode.

In some embodiments, when executing the sub-self-cleaning mode, the control module may be configured to: control the water pump to pump the cleaning liquid out; when it is determined that a preset stop injection condition is met, control the water pump to stop pumping the cleaning liquid out; control the suction drive module to operate to suck dirt from the cleaning part into the sewage tank; when it is determined that a preset stop suction condition is met, control the suction drive module to stop working; and record the current execution times of the sub-self-cleaning mode.

In some embodiments, the water pump may transmit the cleaning liquid from the clean water tank 50 to the nozzle, the nozzle serves as the output end of the cleaning liquid supply assembly, and the cleaning liquid injected by the nozzle may act on the cleaning part (e.g., a roller brush). The water pump is provided on a transmitting path for the cleaning liquid, and when the water pump works, the cleaning liquid in the clean water tank 50 is transmitted to the cleaning part.

In some embodiments, the control module may control whether the cleaning liquid is injected on the cleaning part by controlling a working state of the water pump. For example, the water pump is controlled to pump the cleaning fluid out at a preset flow rate. The working state of the water pump includes a working power and a working time of the water pump. The control module may control the water pump to adjust the preset flow rate by controlling the working power and working time of the water pump. In some embodiments, at different times of the sub-self-cleaning mode, the working state of the water pump may be different. For example, in different sub-cleaning processes, a preset working power and/or preset working time of the water pump may be different.

The preset stop injection condition refers to a condition set in advance for determining whether to control the water pump to stop pumping.

In some embodiments, the control module may control the start and stop of the water pump based on the preset stop injection condition. When the preset stop injection condition is not met, the water pump is controlled to continuously pump the cleaning liquid out; when the preset stop injection condition is met, the water pump is controlled to stop pumping the cleaning liquid out.

The preset stop injection condition may take various forms. In some embodiments, the preset stop injection condition may be at least one of a pump liquid volume of the water pump reaching a preset pump liquid volume, a pump liquid duration of the water pump reaching a preset pump liquid duration, a humidity of the cleaning part reaching a first preset humidity, etc.

In some embodiments, when the pumping liquid volume of the water pump reaches the preset pumping liquid volume, the control module may control the water pump to stop pumping the cleaning liquid out; or when the pumping liquid duration of the water pump reaches the preset pumping liquid duration, the control module may control the water pump to stop pumping the cleaning liquid out; or when the humidity of the cleaning part reaches the first preset humidity, the control module may control the water pump to stop pumping the cleaning liquid out.

The preset pump liquid volume, the preset pump liquid duration, and the first preset humidity may be set based on an actual need, which are not limited to the present disclosure.

In some embodiments, the cleaning system includes a counter, and each time the sub-self-cleaning is completed, the counter is incremented by 1 correspondingly.

In some embodiments, when executing the sub-self-cleaning mode, the control module is also configured to: control the cleaning part to rotate; and when the suction drive module stops working, control the cleaning part to stop rotating.

In some embodiments of the present disclosure, while executing the entire sub-self-cleaning mode entirely, the cleaning part is always kept rotating, so as to make the cleaning part evenly wet.

In some embodiments, when executing the sub-self-cleaning mode, the control module is also configured to: control the cleaning part to rotate when the water pump and the suction drive module are working. In some embodiments, when executing the sub-self-cleaning mode, the control module is also configured to: control the cleaning to rotate part when the water pump and the suction drive module are working, and when the preset stop injection condition is met, control a preset rotation duration of the cleaning part after controlling the water pump to stop pumping the cleaning liquid out. The cleaning part may be evenly wetted by controlling the rotation of the cleaning part.

In some embodiments, when executing the sub-self-cleaning mode, the control module may control an operation of the suction drive module to suck dirt from the cleaning part into the sewage tank. When the preset stop suction condition is met, the suction drive module is controlled to stop working.

In some embodiments, the preset stop suction condition may include at least one of an actual suction duration of the suction drive module reaching a preset stop suction duration, the humidity of the cleaning part being less than a second preset humidity, or the like.

In some embodiments, the control module is configured to: control the suction drive module to stop working when the actual suction duration of the suction drive module reaches the preset stop suction duration; or when it is monitored that the humidity of the cleaning part is less than the second preset humidity, control the suction drive module to stop working.

In some embodiments, the control module is configured to: when executing the self-cleaning mode, if a first predetermined state is monitored, control the battery charging circuit to be effective, so as to charge the rechargeable battery 3. After monitoring the first predetermined state, if a second predetermined state is monitored, the battery charging circuit is controlled to fail, and the self-cleaning mode is continued until it is determined that a self-cleaning completion condition is met, then the self-cleaning mode is exited.

In some embodiments, the first predetermined state includes that the water pump stops pumping the cleaning fluid out. The second predetermined state includes that a first charging parameter meets a first preset stop charging condition.

In some embodiments, the first charging parameter includes a current charging duration, a current charging power, or the like.

In some embodiments, the first charging parameter meeting the first preset stop charging condition includes at least one of the current charging duration reaching a first preset stop charging duration, or the current charging power reaching a first preset stop charging power.

In some embodiments, when a power of the rechargeable battery 3 is high (greater than a first threshold), the first preset stop charging condition may be that the current charging duration reaches the first preset stop charging duration. The first preset stop charging duration needs to be sufficient to fully soak the cleaning part.

In some embodiments, when the power of the rechargeable battery 3 is low (not greater than the first threshold), the first preset stop charging condition may be that the current charging power reaches the first preset stop charging power. The first preset stop charging power needs to be able to execute at least a single time of sub-self-cleaning, so as to avoid problems of poor cleaning effect caused by frequent charging and frequent control of the water pump and a suction motor.

The first preset stop charging duration, the first preset stop charging power, and the first threshold may be system default values, experience values, artificial preset values, etc., or any combination thereof, and may be set according to an actual need, which is not limited herein.

In this embodiment, when the sub-self-cleaning mode is executed each time, if the preset stop injection condition is met, the control module controls the water pump to stop pumping the cleaning liquid out. If the first predetermined state is monitored, the control module controls a charging function to be effective, and electric energy output by the base station 20 may be sent to the rechargeable battery 3 to charge the rechargeable battery 3. Since the cleaning liquid pumped out by the water pump may make the cleaning part wet, during each execution of the sub-self-cleaning mode, when the first predetermined state is monitored and the rechargeable battery 3 is charged, the cleaning part keeps soaked in the cleaning liquid in this way, which is helpful for the subsequent self-cleaning of the cleaning part and improve the self-cleaning effect.

In this embodiment, after monitoring the first predetermined state, and the first charging parameter is monitored to meet the first preset stop charging condition, the battery charging circuit is controlled to fail, and the self-cleaning mode continues to be executed subsequently. In this way, the self-cleaning mode may be continued after the cleaning device is charged.

In some other embodiments, the first predetermined state includes executing a Nth sub-self-cleaning mode and the water pump stopping pumping the cleaning liquid out. The second predetermined state includes that the first charging parameter meets the first preset stop charging condition; wherein N is a positive integer less than or equal to M.

In this embodiment, when the Nth sub-self-cleaning mode is executed, if it is monitored that the preset stop injection condition is met, the water pump is controlled to stop pumping the cleaning fluid out. At this time, the first predetermined state is monitored, and the charging function is further controlled to be effective. The electric energy output by the base station 20 may be sent to the rechargeable battery 3 to charge the rechargeable battery 3. Since the cleaning liquid pumped out by the water pump may make the cleaning part wet, when executing the Nth sub-self-cleaning mode, the cleaning part may be soaked while the rechargeable battery 3 is charged, which is convenient for cleaning the cleaning part subsequently and improves the cleaning effect. After monitoring the first predetermined state, if the first charging parameter meets the first preset stop charging condition, the battery charging circuit fails, and the self-cleaning mode may be continued subsequently. In this way, the self-cleaning mode may be continued after the cleaning device is charged.

In some embodiments, when N is 1 or 2, the self-cleaning is just started, the cleaning part is dirty usually, and the rechargeable battery 3 of the cleaning device usually has less power remaining. After the cleaning liquid has been injected into the cleaning part, the rechargeable battery 3 may be charged at this time. During a charging process, the cleaning part is soaked at the same time, which is convenient for cleaning the cleaning part subsequently and improving the cleaning effect to a certain extent. In addition, charging may no longer be executed in the sub-self-cleaning mode afterward, henceforth reducing the execution duration of the self-cleaning mode.

In some embodiments, when it is monitored that the first charging parameter meets the first preset stop charging condition, the battery charging circuit is controlled to fail, and the self-cleaning mode continues to be executed. In some embodiments, the control module is configured to execute unfinished steps of the self-cleaning mode when it is monitored that the first charging parameter meets the first preset stop charging condition, so as to continue to execute the self-cleaning mode. Exemplarily, when it is monitored that the first charging parameter meets the first preset stop charging condition, the suction drive module is controlled to operate to execute subsequent steps.

In some embodiments, apart from "the water pump stops pumping the cleaning liquid out", the first predetermined state further includes that: the clean water tank 50 is in a lack-of-water state. Correspondingly, apart from "the first charging parameter meets the first preset stop charging condition", the second predetermined state further includes: re-determining that the clean water tank 50 is in a no-lack-of-water state.

In this embodiment, when it is monitored that the water pump stops pumping the cleaning liquid out or the clean water tank 50 is in the lack-of-water state, the battery charging circuit is controlled to be effective. When it is monitored that the first charging parameter meets the first preset stop charging condition or when it is re-determined that the clean water tank 50 is in the no-lack-of-water state, the battery charging circuit is controlled to fail.

In this embodiment, when the clean water tank 50 is short of water or the water pump stops pumping the cleaning liquid out, it is determined that the first predetermined state is monitored, and the battery charging circuit is controlled to be effective. When the water pump pumps the cleaning liquid out, the clean water tank 50 may be short of water. When the clean water tank 50 is short of water, the cleaning part is always soaked. When a water supply time is not very long, a soaking duration of the cleaning part may be increased, thereby increasing the subsequent cleaning effect, and the remaining power of the rechargeable battery 3 may be guaranteed, reducing a charging duration required after the self-cleaning is completed.

In some embodiments, apart from "the water pump stops pumping the cleaning liquid out", the first predetermined state further includes that: the sewage tank 4 is in a full-water state. Correspondingly, apart from "the first charging parameter meets the first preset stop charging condition", the second predetermined state further includes re-determining that the sewage tank 4 is not in the full-water state.

In this embodiment, the charging module may be charged when the sewage tank 4 is full of water, thereby reducing the charging duration required after the self-cleaning is completed.

In some embodiments, apart from "executing the Nth sub-self-cleaning mode and detecting that the water pump stops pumping the cleaning liquid out", the first predetermined state further includes that: the clean water tank 50 is in the lack-of-water state. Correspondingly, apart from "the first charging parameter meets the first preset stop charging condition", the second predetermined state further includes re-determining that the clean water tank 50 is in the no-lack-of-water state.

This embodiment may control the battery charging circuit to be effective when the Nth sub-self-cleaning mode is executed and the water pump stops pumping the cleaning liquid out or the clean water tank 50 is in the lack-of-water state. When it is monitored that the first charging parameter meets the first preset stop charging condition or it is re-determined that the clean water tank 50 is in the no-lack-of-water state, the battery charging circuit is controlled to fail.

In this embodiment, when the clean water tank 50 is short of water or when the Nth sub-self-cleaning mode is executed and the water pump stops pumping the cleaning liquid out, it is determined that the first predetermined state is monitored, and the battery charging circuit is controlled to be effective. When the water pump pumps the cleaning liquid out, the clean water tank 50 may be short of water. Therefore, when the clean water tank 50 is short of water, the cleaning liquid continues to soak the cleaning part. When the water supply time is short, the soaking duration of the cleaning part may be increased, thereby increasing the subsequent cleaning effect; at the same time, the remaining power of the rechargeable battery 3 may be ensured, and the required charging time after the self-cleaning is completed may be reduced.

In some embodiments, apart from "executing the Nth sub-self-cleaning mode and the water pump stops pumping the cleaning liquid out", the first predetermined state further includes: the sewage tank 4 is in the full-water state. Correspondingly, apart from "the first charging parameter meets the first preset stop charging condition", the second predetermined state further includes re-determining that the sewage tank 4 is not in the full-water state.

In this embodiment, the charging module may be charged when the sewage tank 4 is full of water, thereby reducing the required charging time after the self-cleaning is completed.

In some embodiments, apart from "the water pump stops pumping the cleaning liquid out", the first predetermined state further includes that: the clean water tank 50 is in the lack-of-water state, and the sewage tank 4 is in the full-water state. Correspondingly, apart from "the first charging parameter meets the first preset stop charging condition", the second predetermined state further includes re-determining that the clean water tank 50 is in the no-lack-of-water state, and re-determining that the sewage tank 4 is not in the full-water state.

This embodiment may control the battery charging circuit to be effective when it is monitored that the water pump stops pumping the cleaning liquid out, when the clean water tank 50 is in the lack-of-water state, or when the sewage tank 4 is in the full-water state. Correspondingly, when it is monitored that the first charging parameter meets the first preset stop charging condition, when it is re-determined that the clean water tank 50 is in the no-lack-of-water state, or when the sewage tank 4 is not in the full-water state, the battery charging circuit is controlled to fail.

In this embodiment, the charging module may be charged when the sewage tank 4 is full of water and the clean water tank 50 is short of water, thereby reducing the required charging time after the self-cleaning. When the clean water tank 50 is short of water, the cleaning part is soaked all the time, and when the water supply time is not very long, the soaking duration of the cleaning part may be increased, thereby increasing the subsequent cleaning effect.

In some embodiments, apart from "executing the Nth sub-self-cleaning mode and the water pump stops pumping the cleaning liquid out", the first predetermined state further includes: the clean water tank 50 is in the lack-of-water state, and the sewage tank 4 is in the full-water state. Correspondingly, apart from "the first charging parameter meets the first preset stop charging condition", the second predetermined state includes re-determining that the clean water tank 50 is in the no-lack-of-water state, and re-determining that the sewage tank 4 is not in the full-water state.

In this embodiment, when it is monitored that the Nth sub-self-cleaning mode is executed and the water pump stops pumping the cleaning liquid out or the clean water tank 50 is in the lack-of-water state or the sewage tank 4 is in the full-water state, the battery charging circuit is controlled to be effective. Correspondingly, when it is monitored that the first charging parameter meets the first preset stop charging condition or when it is re-determined that the clean water tank 50 is in the no-lack-of-water state or that the sewage tank 4 is not in the full-water state, the battery charging circuit is controlled to fail.

In this embodiment, the charging module may be charged when the sewage tank 4 is full of water and the clean water tank 50 is short of water, thereby reducing the required charging time after self-cleaning. When the clean water tank 50 lacks water, the cleaning part is always soaked. When the water supply duration is not very long, the soaking duration of the cleaning part may be increased, thereby increasing the subsequent cleaning effect. At the same time, the charging module may be charged when the sewage tank 4 is full of water, thereby reducing the required charging time after the self-cleaning.

In some embodiments, the first predetermined state includes that: the clean water tank 50 is in the lack-of-water state, the execution times of the sub-self-cleaning mode reaches X times and it is judged that the clean water tank has not been in the lack-of-water state during the execution times of the sub-self-cleaning mode, and X is a positive integer less than or equal to M. Correspondingly, the second predetermined state includes: re-determining that the clean water tank 50 is in the no-lack-of-water state or that the first charging parameter meets the first preset stop charging condition.

In some embodiments, the first predetermined state includes that: the sewage tank 4 is in the full-water state, the execution times of the sub-self-cleaning mode reaches X times and it is judged that the sewage tank 4 has not been in the full-water state during the execution times of the sub-self-cleaning mode, and X is a positive integer less than or equal to M. Correspondingly, the second predetermined state includes: re-determining that the sewage tank 4 is not in the full-water state or the first charging parameter meets the first preset stop charging condition.

In some embodiments, the first predetermined state includes that: the clean water tank 50 is in the lack-of-water state, the sewage tank 4 is in the full-water state, the execution times of the sub-self-cleaning mode reaches X times, and it is judged that the clean water tank 50 has not been in the lack-of-water state during the execution times of the sub-self-cleaning mode, or the sewage tank 4 has not been in the full-water state during the execution times of the sub-self-cleaning mode, and X is a positive integer less than or equal to M. Correspondingly, the second predetermined state includes: re-determining that the clean water tank 50 is in the no-lack-of-water state, re-determining that the sewage tank 4 is not in the full-water state, or the first charging parameter meets the first preset stop charging condition.

During executing the self-cleaning mode, if it is judged that the first predetermined state is reached, the rechargeable battery 3 is charged, which can avoid the situation that the rechargeable battery 3 is insufficient to complete the self-cleaning mode.

In some embodiments, the first predetermined state includes: during a Yth sub-self-cleaning mode, when the water pump stops pumping the cleaning liquid out, judging that the clean water tank 50 has not been in the no-lack-of-water state before or the sewage tank 4 has not been in the full-water state before, Y is a positive integer less than or equal to M. Correspondingly, the second predetermined state includes that: the first charging parameter meets the first preset stop charging condition.

In some embodiments, Y is 1. When the self-cleaning mode just begins to be executed, the cleaning part is relatively dirty. At this time, charging is executed while the water pump stops pumping the cleaning liquid out. On the one hand, it is convenient to avoid the situation of an insufficient remaining power. On the other hand, the cleaning part may be soaked to enhance the follow-up cleaning effect.

In some embodiments, the first predetermined state includes: the remaining power of the rechargeable battery 3 is less than a preset remaining power. Correspondingly, the second predetermined state includes that: a second charging parameter meets a second preset stop charging condition.

In the prior art, when the self-cleaning mode is executed, the remaining power must be 10% of a total power, that is, when the remaining power is less than 10%, the self-cleaning mode cannot be executed. However, in this embodiment, the preset remaining power is less than 10% in the prior art. For example, the preset remaining power may be 5%, 4%, 3%, . . . , or even 0%.

In some embodiments, the second charging parameter includes the current charging power, a current remaining power, or the like.

In some embodiments, the second charging parameter meeting the second preset stop charging condition includes at least one of the current charging power reaching a second preset stopping charging condition, the current remaining power reaching a power required to complete the remaining self-cleaning mode, or the current remaining power reaching a second threshold.

The second preset stop charging condition and the second threshold may be system default values, experience values, artificial preset values, etc., or any combination thereof, and may be set according to actual needs, which is not limited herein.

In some embodiments, the second threshold corresponding to the second preset stop charging condition may be set as a power that is enough to execute a single time of sub-self-cleaning mode. A plurality of times of charging and sub-self-cleaning may be executed with this setup. By executing and cycling the plurality times of charging and sub-self-cleaning, self-cleaning may be executed while charging, avoiding the situation of cleaning device from smelling and improving cleaning efficiency.

After the second preset stop charging condition is met, the cleaning device may continue to execute the unfinished self-cleaning mode. That is to say, the cleaning device may execute self-cleaning for a time period when there is a small amount of power; when there is no power, it may be charged first; when it is charged to meet the second preset stop charging condition, it may continue to execute the unfinished self-cleaning mode. In this embodiment, the user does not need to press a self-cleaning button again to activate the self-cleaning mode again, so as to avoid the situation that the cleaning device becomes smelly due to the user's forgetting.

In some embodiments, the control module is configured to: exit the self-cleaning mode when it is determined that the M times of sub-self-cleaning mode have been executed; or, exit the self-cleaning mode when it is determined that a dirt degree of the cleaning part is lower than a preset dirt degree.

In some embodiments, the base station 20 includes a water storage tank. When the cleaning device is docked with the base station 20, the water storage tank is used to provide the cleaning liquid to the clean water tank 50. In some embodiments, the control module is further configured to: during executing the self-cleaning mode, if it is determined that the clean water tank 50 is in the lack-of-water state, then open a liquid path between the water storage tank and the clean water tank 50, so that the water storage tank may provide the cleaning liquid with the clean water tank 50.

In some embodiments, the base station 20 includes a dirt storage tank. When the cleaning device is docked with the base station 20, the dirt storage tank is used to store dirt in the sewage tank 4. In some embodiments, the control module is further configured to: during executing the self-cleaning mode, if it is determined that the sewage tank 4 is in the full-water state, open the liquid path between the sewage tank 4 and the dirt storage tank, and suck dirt in the sewage tank 4 into the dirt storage tank.

In some embodiments, a float is provided in the clean water tank 50, and a reed switch is provided in an accommodating space for installing the clean water tank 50 on the cleaning device. In some embodiments, the control module is configured to: monitor whether the reed switch is triggered by the float, so as to detect whether the clean water tank 50 is in the lack-of-water state. In some embodiments, when the reed switch is triggered by the float, it is determined that the clean water tank 50 is in the lack-of-water state, otherwise, it is determined that the clean water tank 50 is in the no-lack-of-water state.

In some embodiments, it may be determined whether the clean water tank 50 is in the lack-of-water state by detecting a working current value of the water pump. In some embodiments, the control module is configured to: judge whether the working current value of the water pump is less than a preset current value, so as to detect whether the clean water tank 50 is in the lack-of-water state. For example, when the working current value of the water pump is less than the preset current value, it is determined that the clean water tank 50 is in the lack-of-water state. When the clean water tank 50 lacks water, if the water pump works normally, a no-load phenomenon may occur. According to this phenomenon, by using the working current value of the water pump, it may judge whether the clean water tank 50 is short of water, without setting a special detection element to detect whether the clean water tank 50 is short of water.

In some embodiments, a water level electrode is provided in the sewage tank 4. Whether the sewage tank 4 is in the full-water state may be detected according to whether the water level electrode is conducting. In some embodiments, the control module is configured to: judge whether the water level electrode is conducted, so as to detect whether the sewage tank 4 is in the full-water state. For example, when the water level electrode is conducted, it is determined that the sewage tank 4 is in the full-water state; when the water level electrode is not conducted, it is determined that the sewage tank 4 is not in the full-water state. In practical applications, there are other feasible ways to judge whether the sewage tank 4 is in the full-water state, which is not limited in the embodiment of the present disclosure.

In some embodiments, a turbidity sensor is provided at an inlet of the sewage tank, and the turbidity sensor is used to detect turbidity data of dirt sucked into the sewage tank.

The turbidity data refers to data related to dirt that is sucked into the sewage tank.

In some embodiments, the turbidity data may include a turbidity degree of dirt or the like. The turbidity degree refers to a degree to which dirt in water blocks the penetration of light. In some embodiments, the turbidity degree may be used to represent the proportion of dirt in the water. The higher the turbidity degree, the more dirt in the water; and the lower the turbidity degree, the less dirt in the water.

In some embodiments, the control module is further configured to: determine an initial dirt feature of the cleaning device based on an initial turbidity data sequence detected by the turbidity sensor; and determine the times M of sub-self-cleaning mode based on the initial dirt feature.

The turbidity sensor refers to a sensor capable of detecting dirt turbidity data. For example, the turbidity sensor may be a Jackson Candle Nephelometer or the like.

The initial turbidity data sequence refers to a sequence of turbidity data of the dirt sucked into the sewage tank when the sub-self-cleaning mode is executed for preset times. In some embodiments, the turbidity sensor may detect the turbidity data of the dirt sucked into the sewage tank while the sub-self-cleaning mode is executed for the preset times to obtain the initial turbidity data sequence. The preset times may be less than the times M of the sub-self-cleaning mode.

The initial dirt feature refers to a feature parameter of a dirt situation when the cleaning device begins to execute the sub-self-cleaning for preset times.

In some embodiments, the initial dirt feature may include a dirt degree and a difficulty in self-cleaning.

The dirt degree refers to a severity of dirt in the cleaning device. In some embodiments, the control module may determine the dirt degree of the cleaning device based on turbidity data detected during each sub-cleaning in the initial turbidity data sequence. For example, a mean value of turbidity data in the initial turbidity data sequence is determined as the severity of the cleaning device.

The difficulty in self-cleaning refers to a difficulty with which the cleaning device cleans itself through self-cleaning.

In some embodiments, the control module may determine the difficulty in self-cleaning of the cleaning device according to the initial turbidity data sequence and the dirt degree of the cleaning device. For example, the control module may determine the difficulty in self-cleaning of the cleaning device through a preset judgment rule based on an average difference of turbidity data detected during each time of sub-self-cleaning in the initial turbidity data sequence and the dirt degree of the cleaning device. An exemplary preset judgment rule may be that: the smaller the average difference, the greater the dirt degree, and the higher the difficulty in self-cleaning. An exemplary preset judgment rule may be that: the smaller the dirt degree, the lower the difficulty in self-cleaning. An exemplary preset judgment rule may also be: determining a calculation result of dividing a quantified value of the dirt degree by the average difference as a quantified value of difficulty in self-cleaning. The larger the quantitative value of the dirt degree, the greater the dirt degree; and the larger the quantitative value of the difficulty in self-cleaning, the higher the difficulty in self-cleaning. Determining the difficulty in self-cleaning is only illustrative, and the difficulty in self-cleaning may also be determined in other feasible ways, which is not limited herein.

In some embodiments of the present disclosure, it is determined that the difficulty in self-cleaning of the cleaning device is relatively high when the average difference of turbidity data in the initial turbidity data sequence is small and the dirt degree is large through the preset judgment rule. The above method can accurately and efficiently determine the situation that the turbidity dirt degree obtained each time from self-cleaning is relatively high and similar, as being more difficult to clean, that is, the difficulty in self-cleaning is higher. At the same time, the above method can accurately and efficiently determine the difficulty in self-cleaning when the dirt degree is small. When the dirt degree is small, the average difference of the turbidity data may be reduced due to the turbidity data itself, so the average difference of the turbidity data may be correspondingly smaller. Correspondingly, if the average difference of the turbidity data obtained at this time is the same as the average difference of the turbidity data obtained when the dirt degree is relatively large, then the difficulty in self-cleaning at this time is relatively small.

In some embodiments, the control module may determine the times M of the sub-self-cleaning mode based on the initial dirt feature. In some embodiments, the control module may determine the times M of the sub-self-cleaning mode based on a first score of the initial dirt feature. For example, the higher the first score of the initial dirt feature, the greater the times M of the sub-self-cleaning mode. In some embodiments, the control module may weight the dirt degree and the difficulty in self-cleaning to determine the first score of the initial dirt feature. When determining the first score, a weight corresponding to the dirt degree is higher than a weight corresponding to the difficulty in self-cleaning.

In some embodiments, the control module may determine the times M of the sub-self-cleaning mode based on a dirt degree in the initial dirt feature. For example, the higher the dirt degree, the greater the times M of the sub-self-cleaning mode.

In some embodiments of the present disclosure, the turbidity data is obtained by the turbidity sensor, and then the times of the sub-self-cleaning mode is determined, which can be more reasonable and targeted to execute more sub-self-cleaning when the cleaning device is dirty. When the device is not too dirty, self-cleaning is executed less, which effectively reduces self-cleaning time and saves water and electricity resources.

In some embodiments, the control module is further configured to: determine a turbidity detection cycle based on the initial dirt feature; and adjust the times M of the sub-self-cleaning mode based on a subsequent turbidity data sequence obtained during the turbidity detection cycle.

The turbidity detection cycle refers to the times of sub-self-cleaning involved in subsequent turbidity detection. The subsequent turbidity detection refers to a turbidity detection executed during the subsequent sub-cleaning process after sub-self-cleaning is executed for the preset times. Times of subsequent sub-self-cleaning are a difference between the times M of the sub-self-cleaning mode minus the preset times.

In some embodiments, the turbidity sensor may detect turbidity data of dirt sucked into the sewage tank during each sub-self-cleaning in the turbidity detection cycle. The longer the turbidity detection cycle, the more sub-self-cleaning times involved in each turbidity detection.

In some embodiments, the control module may determine the turbidity detection cycle based on a second score of the initial dirt feature. For example, the higher the second score of the initial dirt feature, the shorter the turbidity detection cycle. In some embodiments, the control module may weight the dirt degree and the difficulty in self-cleaning to determine the second score of the initial dirt feature. When determining the second score, the weight corresponding to the dirt degree is lower than the weight corresponding to the difficulty in self-cleaning.

In some embodiments, the control module may determine the turbidity detection cycle through a preset determination rule based on the difficulty in self-cleaning in the initial dirt feature. An exemplary preset determination rule may be: the lower the difficulty in self-cleaning, the shorter the turbidity detection cycle. The turbidity detection cycle may also be determined in other feasible ways, which is not limited herein.

In some embodiments, the control module may determine a detection cycle interval based on the initial dirt feature. The detection cycle interval refers to times of sub-self-cleaning between two adjacent turbidity detection cycles. The longer the detection cycle interval, the greater the times of sub-self-cleaning between two adjacent turbidity detection cycles. The method for determining the detection period interval is similar to that of the turbidity detection cycle, for example, the lower the difficulty in self-cleaning, the shorter the detection period interval, which may not be repeated herein.

In some embodiments of the present disclosure, the turbidity detection cycle and detection cycle interval are determined according to the initial dirt feature, which can prevent the cleaning device from continuing to self-clean after it has been cleaned, reduce the self-cleaning time, and ensure the self-cleaning effect.

The subsequent turbidity data sequence refers to a sequence of turbidity data obtained in the turbidity detection cycle. The subsequent turbidity data sequence may include turbidity data of dirt sucked into the sewage tank during each sub-self-cleaning in the turbidity detection cycle.

In some embodiments, the subsequent turbidity data sequence may include a plurality of turbidity data sequences corresponding to a plurality of turbidity detection cycles.

In some embodiments, the turbidity sensor may obtain turbidity data of dirt sucked into the sewage tank during each sub-self-cleaning in at least one turbidity detection cycle, then obtain the subsequent turbidity data sequence.

In some embodiments, the control module may determine an updated dirt feature based on the subsequent turbidity data sequence; determine the single cleaning effect of the subsequent sub-self-cleaning based on the initial dirt feature and the updated dirt feature; and adjust the times M of the sub-self-cleaning mode based on the single cleaning effect and the updated dirt feature.

The subsequent sub-self-cleaning refers to one or more sub-cleaning processes involved in the subsequent turbidity data sequence.

The updated dirt feature refers to a feature parameter of a dirty situation of the cleaning device when it executes a plurality of sub-self-cleaning subsequently. The updated dirt feature is similar to the initial dirt feature. For more information, please refer to the relevant description above which may not be repeated herein.

In some embodiments, the control module may determine a dirt feature difference based on the initial dirt feature and updated dirt feature; a ratio of the dirt feature difference to the turbidity detection cycle is determined as the single cleaning effect of the subsequent sub-self-cleaning. The single cleaning effect may also be determined in other feasible ways, which is not limited herein.

In some embodiments, the control module may determine remaining times based on the single cleaning effect of the subsequent sub-self-cleaning and updated dirt feature; and adjust the times M of the sub-self-cleaning mode based on the remaining times dynamically.

The remaining times refer to times of sub-self-cleaning modes that need to be executed to achieve the target cleaning effect. The target cleaning effect refers to a clean state achieved by the cleaning device after self-cleaning. In some embodiments, the target cleaning effect may be determined from turbidity data at the clean state achieved by the cleaning device. For example, it is possible to manually determine whether the cleaning device has reached the clean state, and use the turbidity sensor to obtain current turbidity data as the target cleaning effect.

In some embodiments, the control module may determine the current cleaning effect based on the updated dirt feature, and determine remaining times S based on the single cleaning effect of the subsequent sub-self-cleaning, the current cleaning effect and the target cleaning effect. For example, the control module may determine an absolute value of a difference between the target cleaning effect and the current cleaning effect, and round a ratio of the absolute value of the difference to the single cleaning effect to obtain the remaining times.

In some embodiments, the control module may determine the current cleaning effect by querying a preset comparison table based on the updated dirt feature. The preset comparison table includes a corresponding relationship between different dirt features and different cleaning effects, and the preset comparison table may be determined based on prior knowledge or historical data.

In some embodiments, the remaining times may also be determined through a times determination model. For more details, please refer to FIG. 5 and related descriptions.

In some embodiments, the control module may adjust the times M of the sub-self-cleaning mode to the remaining times, and control the cleaning device to exit the self-cleaning mode after completing the remaining times of the sub-self-cleaning mode.

In some embodiments of the present disclosure, the turbidity sensor is used to detect turbidity data of dirt sucked into the sewage tank in different turbidity detection cycles, so that the self-cleaning effect of the cleaning device can be monitored in real-time, and a detection cost can be effectively reduced. In a self-cleaning process, adjusting the times of the sub-self-cleaning mode according to turbidity data after the previous sub-self-cleaning can adjust the self-cleaning process and the remaining times of the sub-self-cleaning in real-time according to the self-cleaning effect of the cleaning device. In this way, the self-cleaning effect and efficiency can be effectively improved.

In some embodiments, the control module is further configured to: determine a single water supply volume of the clean water tank in each sub-self-cleaning mode based on the dirt feature and the times M of the sub-self-cleaning mode.

The dirt feature refers to parameters that may reflect a dirt situation of the cleaning device during the self-cleaning process. In some embodiments, the dirt feature includes the initial dirt feature and the updated dirt feature. For more instructions on the initial dirt feature and updated dirt feature, please refer to the previous related descriptions.

The single water supply volume refers to a water supply volume of the clean water tank for each self-cleaning.

In some embodiments, the control module may determine the single water supply volume of the clean water tank for each sub-self-cleaning through a preset water supply rule based on the dirt feature and the times M of the sub-self-cleaning mode. An exemplary preset water supply rule may be: when the dirt feature is less than a preset dirt threshold, reducing a single water supply volume in a subsequent sub-self-cleaning mode. An exemplary preset water supply rule may be: when the times of the sub-self-cleaning mode is greater than a preset times threshold, reducing the single water supply volume in the subsequent sub-self-cleaning mode. The preset dirt threshold and the preset times threshold may be system default values, experience values, artificial preset values, etc., or any combination thereof, and may be set according to actual needs, which is not limited herein.

In some embodiments, the control module may activate the self-cleaning mode after receiving the trigger signal from the trigger control part, control the cleaning device to execute the M times of sub-cleaning mode, and control the clean water tank to supply water to the cleaning part according to the single water supply volume for each sub-self-cleaning.

Through some embodiments of the present disclosure, based on the dirt feature and the times M of the sub-self-cleaning mode, the single water supply volume of the clean water tank for each sub-self-cleaning may be determined, and a water supply volume of the clean water tank for each sub-self-cleaning may be reasonably allocated according to the actual situation, henceforth reducing the single water supply volume and saving water. For example, when the cleaning device is self-cleaning to a certain extent and the dirt feature is less than the preset dirt threshold, the cleaning device is basically cleaned and only needs to be simply rinsed without excessive water.

Figure 3:
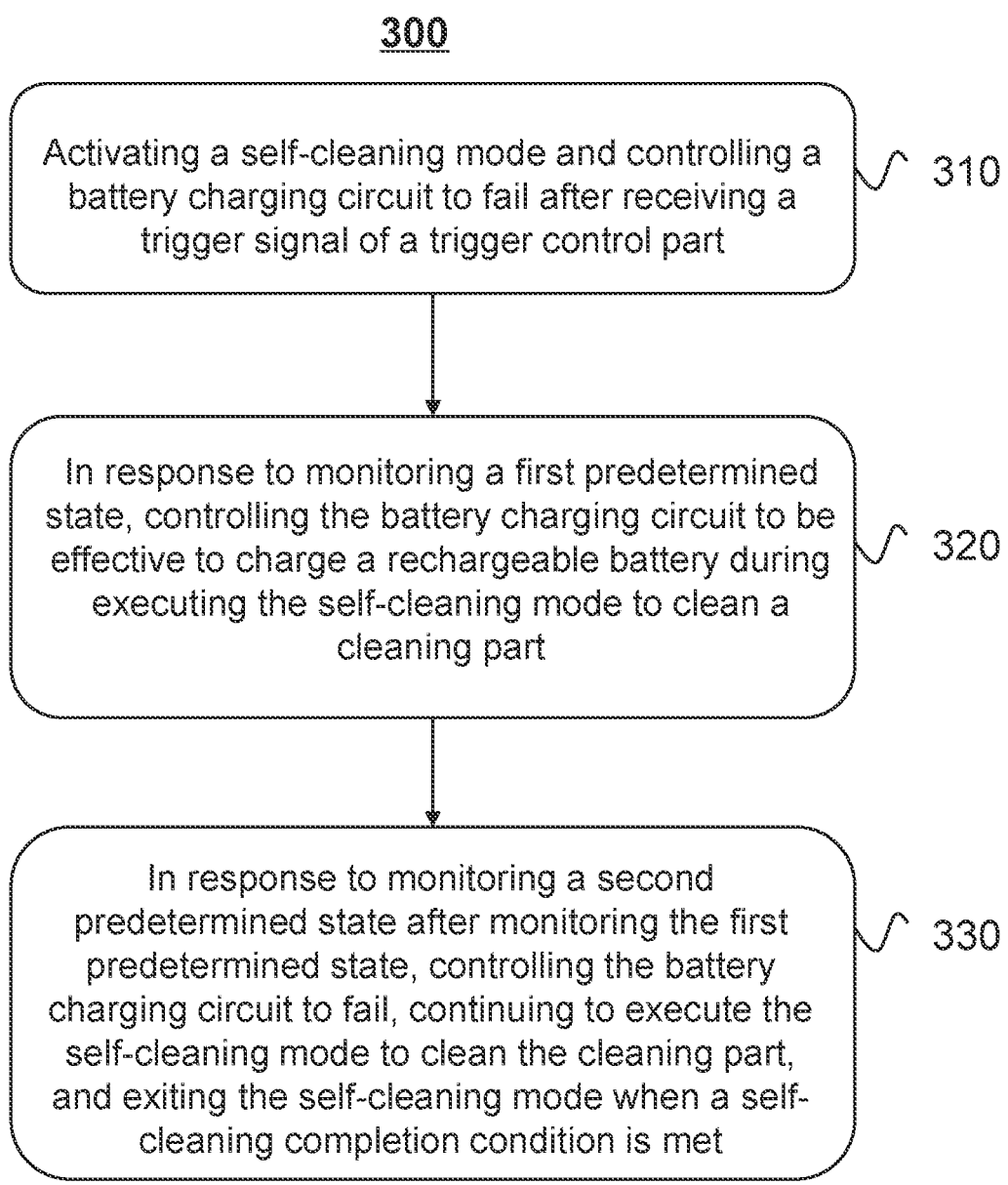
FIG. 3 is a flowchart illustrating an exemplary self-cleaning method for the cleaning device according to some embodiments of the present disclosure.

FIG. 3 is a flowchart illustrating an exemplary self-cleaning method for a cleaning device according to some embodiments of the present disclosure. In some embodiments, a process 300 may be executed by a control module. In some embodiments, the process 300 may be accomplished with one or more additional operations not described below, and/or without one or more operations discussed below. In addition, an order of operations shown in FIG. 3 is not limiting. As shown in FIG. 3, the process 300 may include following steps.

Step 310, activating a self-cleaning mode and controlling a battery charging circuit to fail after receiving a trigger signal from a trigger control part.

Step 320, in response to monitoring a first predetermined state, controlling the battery charging circuit to be effective to charge a rechargeable battery during executing the self-cleaning mode to clean a cleaning part.

Step 330, in response to monitoring a second predetermined state after monitoring the first predetermined state, controlling the battery charging circuit to fail, continuing to execute the self-cleaning mode to clean the cleaning part, and exiting the self-cleaning mode when a self-cleaning completion condition is met.

In some embodiments of the present disclosure, when a user activates the self-cleaning mode, the self-cleaning mode may be executed without needing to add water to a clean water tank and clean a sewage tank, and a remaining power of the rechargeable battery is enough to execute an entire self-cleaning mode, then the self-cleaning mode is executed. It avoids a situation in which a cleaning device stinks due to the user forgetting to activate the self-cleaning mode, and also avoids the need for the user to operate a self-cleaning button multiple times, thereby improving user experience. Moreover, when the self-cleaning mode is executed, if an amount of sewage in the sewage tank is small, the user only needs to clean up it after the self-cleaning mode is completed, which can reduce a count of cleaning. When the self-cleaning mode is executed, if the clean water tank has a large amount of water, there is no need to add water to the clean water tank when the self-cleaning mode is executed, which can reduce a count of adding water. At the same time, the self-cleaning mode may also be activated when the remaining power of the rechargeable battery does not reach a required power for executing the entire self-cleaning mode. In addition, during a self-cleaning process entirely, the rechargeable battery may be charged, and the self-cleaning mode may be executed for a time period when the battery is low, so as to avoid dirt staying in the cleaning part and the sewage tank for a long time due to an insufficient power and long-term charging, which is difficult to clean up or take longer to clean later.

The self-cleaning method shown in FIG. 3 may be applied to the above-mentioned cleaning system. Preferably, the self-cleaning method shown in FIG. 3 may be applied to a cleaning device in the above-mentioned cleaning system.

In some embodiments, the self-cleaning mode includes M times of sub-self-cleaning mode. Activating the self-cleaning mode includes executing the M times of sub-self-cleaning mode. For more instructions, please see the related description above.

Figure 4:
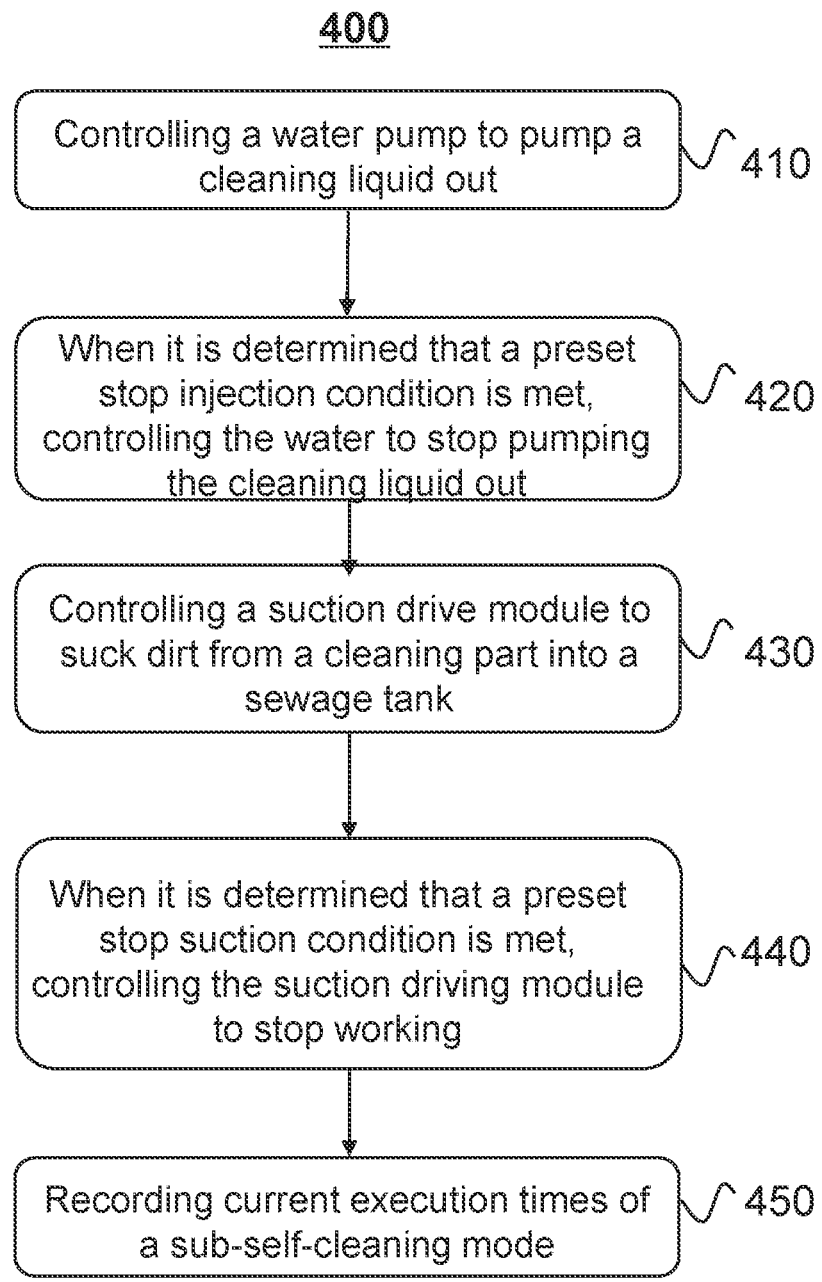
FIG. 4 is a flowchart illustrating an exemplary execution of a sub-self-cleaning mode according to some embodiments of the present disclosure.

FIG. 4 is a flowchart illustrating an exemplary execution of a sub-self-cleaning mode according to some embodiments of the present disclosure. In some embodiments, a process 400 may be executed by a control module. As shown in FIG. 4, the process 400 includes following steps.

Step 410, controlling a water pump to pump a cleaning liquid out.

Step 420, when it is determined that a preset stop injection condition is met, controlling the water pump to stop pumping the cleaning liquid out.

In some embodiments, the preset stop injection condition may be set manually or by a system.

In some embodiments, the preset stop injection condition may be that a pump liquid volume of the water pump reaches a preset pump liquid volume; or, a pump liquid duration of the water pump reaches a preset pump liquid duration; or, a humidity of a cleaning part reaches a first preset humidity. For more descriptions about the preset stop injection condition, please refer to the relevant descriptions in FIGS. 1-2.

In some embodiments, the control module may obtain an actual pumping volume, an actual pumping duration, or an actual humidity of the cleaning part of the water pump, and compare them with the preset pumping volume, the preset pumping duration, or the first preset humidity to judge whether the preset stop injection condition is met or not.

Step 430, controlling a suction drive module to suck dirt from the cleaning part into a sewage tank.

Step 440, when it is determined that a preset stop suction condition is met, controlling the suction drive module to stop working.

The preset stop suction condition refers to a condition set in advance for determining whether to stop suction.

In some embodiments, the preset stop suction condition may be that an actual suction duration of the suction drive module reaches a preset stop suction duration; or, it is monitored that the humidity of the cleaning part is less than a second preset humidity. For more descriptions about the preset stop suction condition, please refer to the related descriptions of FIGS. 1-2.

Step 450, recording current execution times of the sub-self-cleaning mode.

In some embodiments, the control module may use a counter to record the execution times of the sub-self-cleaning mode. For more description about the sub-self-cleaning mode, please refer to FIGS. 1-3 and their related descriptions.

It should be noted that the above descriptions about the processes 300 and 400 are only for illustration and description, and do not limit the scope of application of the present disclosure. For those skilled in the art, various modifications and changes may be made to the processes 300 and 400 under the guidance of the present disclosure. However, such modifications and changes are still within the scope of the present disclosure.

Figure 5:
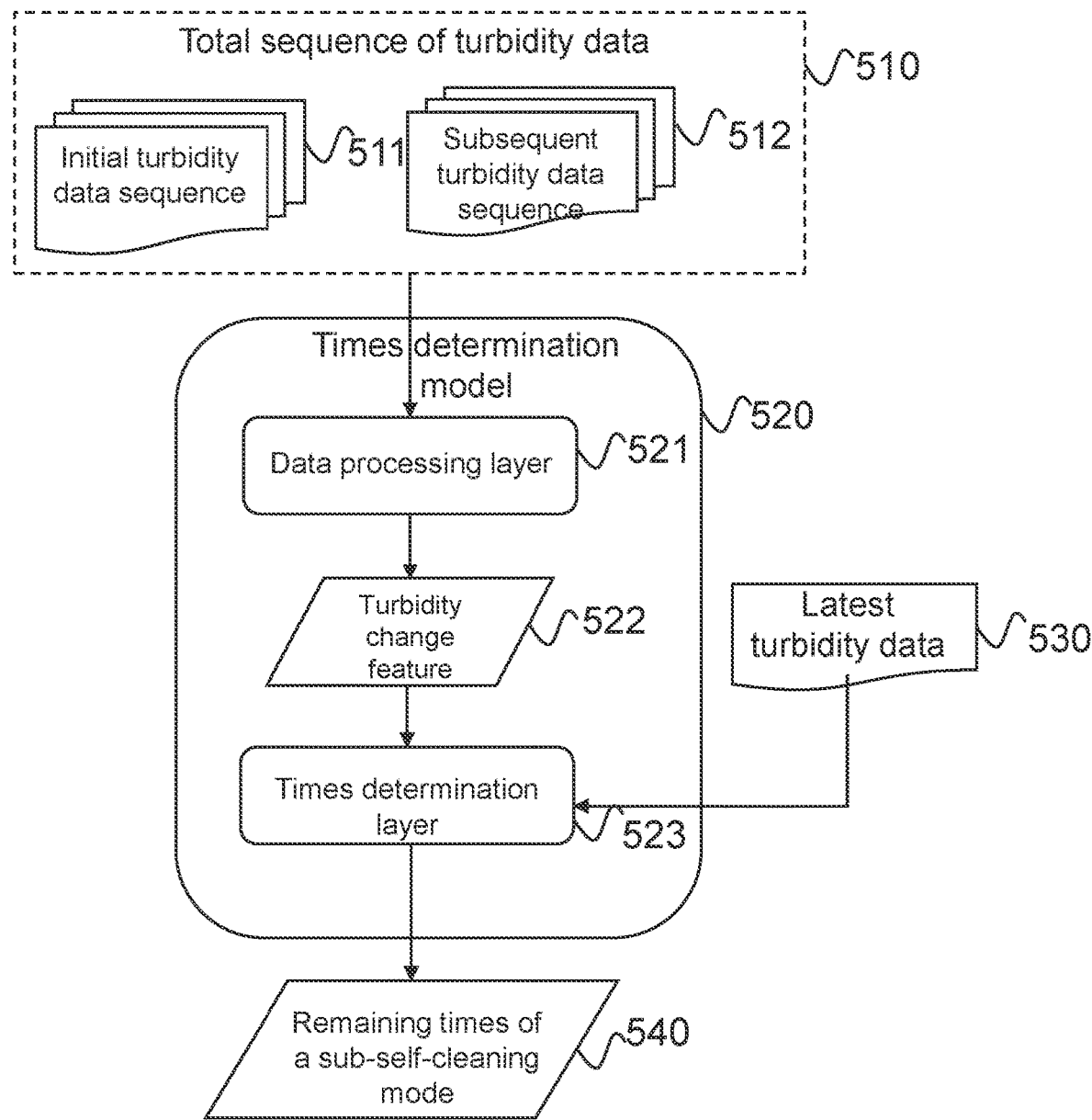
FIG. 5 is a schematic diagram illustrating an exemplary determination of remaining times by applying a times determination model according to some embodiments of the present disclosure.

FIG. 5 is a schematic diagram illustrating an exemplary determination of remaining times by applying a times determination model according to some embodiments of the present disclosure.

In some embodiments, a times determination model 520 includes a data processing layer 521 and a times determination layer 523. In some embodiments, the data processing layer 521 may be a model such as Convolutional Neural Networks (CNN), and the times determination layer 523 may be a model such as Neural Networks (NN) or Deep Neural Networks (DNN).

In some embodiments, an input of the data processing layer 521 includes a total sequence of turbidity data 510 and an output includes a turbidity change feature 522.

The total sequence of turbidity data 510 refers to a sequence composed of turbidity data of each time of sub-self-cleaning from the start of self-cleaning to the end of self-cleaning.

In some embodiments, the total sequence of turbidity data 510 includes an initial turbidity data sequence 511 and a subsequent turbidity data sequence 512 corresponding to at least one turbidity detection cycle. For example, the total sequence of turbidity data 510 may be ((a1, a2, a3, . . . ), (b1, b2, b3, . . . ), (c1, c2, c3 . . . ), etc.), where a1, a2, a3, b1, b2, b3, c1, c2, c3 are turbidity data, (a1, a2, a3, etc.) is the initial turbidity data sequence 511, (b1, b2, b3, etc.) is a subsequent turbidity data sequence corresponding to a first turbidity detection cycle, (c1, c2, c3, etc.) is a subsequent turbidity data sequence corresponding to a second turbidity detection cycle. For more descriptions about the initial turbidity data sequence 511, the turbidity detection cycle, and the subsequent turbidity data sequence 512, please refer to FIG. 1 and FIG. 2 and their related descriptions.

The turbidity change feature 522 refers to a feature in that a turbidity sensor detects a change of turbidity data in a sewage tank. For example, the turbidity change feature 522 may include features such as increased turbidity, no change in turbidity, decreased turbidity, or the like.

In some embodiments, an input of the times determination layer 523 includes the turbidity change feature 522 and latest turbidity data 530, and an output includes remaining times of a sub-self-cleaning mode 540.

The latest turbidity data 530 refers to last turbidity data in a subsequent turbidity data sequence corresponding to a last turbidity detection cycle.

In some embodiments, the output of the data processing layer 521 may be the input of the times determination layer 523, and the times determination layer 523 and the data processing layer 521 may be obtained through a joint training.

In some embodiments, sample data for the joint training includes a total sequence of sample turbidity data, latest sample turbidity data, and a label are sample remaining times of the sub-self-cleaning mode. An exemplary joint training process includes: inputting the total sequence of sample turbidity data into an initial data processing layer to obtain the turbidity change feature output by the initial data processing layer; inputting the turbidity change feature output by the initial data processing layer and the latest sample turbidity data to an initial times determination layer, then obtaining remaining times of the sub-self-cleaning mode output by the initial times determination layer. A loss function is constructed based on the label and the output of the initial times determination layer, and parameters of the initial times determination layer and the initial data processing layer are updated synchronously. By updating the parameters, a well-trained times determination layer 523 and data processing layer 521 are obtained.

In some embodiments, a training sample may be obtained based on historical data (e.g., historical cleaning data), and the label may be obtained through labeling. For example, the historical cleaning data includes turbidity data of each execution of the sub-self-cleaning mode, and a control module may divide the historical cleaning data into two parts, and determine turbidity data sequence of a plurality of times of the sub-self-cleaning mode included in a previous part as the sample total sequence of turbidity data, determine turbidity data of a last time of the sub-self-cleaning mode in the previous part as the latest sample turbidity data, and determine times of the sub-self-cleaning mode executed in a latter part as the label. A last sub-self-cleaning mode in the latter part may be determined according to the target cleaning effect, for example, a sub-self-cleaning mode that achieves the target cleaning effect is determined as the last sub-self-cleaning mode.

In some embodiments, the times determination model 520 may be downloaded to the control module of a cleaning device for use after being trained by an external processor.

In some embodiments of the present disclosure, the total sequence of turbidity data and the latest turbidity data are processed by the times determination model, so the self-learning ability of a machine learning model may be used to find a law from a large amount of historical turbidity data and obtain a correlation between the total sequence of turbidity data, the latest turbidity data and the remaining times of sub-self-cleaning, henceforth improving the accuracy and efficiency of determining the remaining times; applying the times determination model 520 including the data processing layer 521 and the times determination layer 523 is beneficial to solve the problem that is difficult to obtain the label when the data processing layer 521 and the times determination layer 523 are trained alone. Furthermore, jointly training the data processing layer 521 and the times determination layer 523 can not only reduce a count of required samples but also improve training efficiency.

Figure 6:
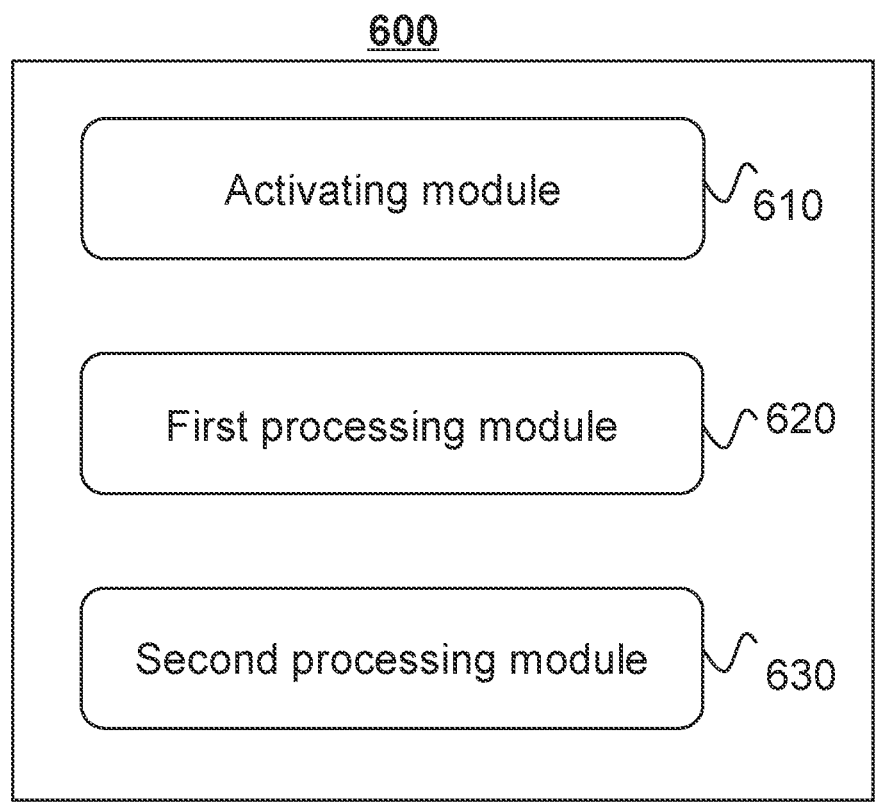
FIG. 6 is a schematic diagram illustrating an exemplary self-cleaning system according to some embodiments of the present disclosure.

Some embodiments of the present disclosure provide a self-cleaning system. FIG. 6 is a schematic diagram illustrating an exemplary self-cleaning system according to some embodiments of the present disclosure. As shown in FIG. 6, a self-cleaning system 600 includes an activating module 610, a first processing module 620, and a second processing module 630.

The activating module 610 is configured to activate a self-cleaning mode after receiving a trigger signal from the self-cleaning mode, and control a battery charging circuit of a cleaning device to fail;

The first processing module 620 is configured to control the battery charging circuit of the cleaning device to be effective in response to monitoring a first predetermined state during executing the self-cleaning mode, so as to charge a rechargeable battery during executing the self-cleaning mode;

The second processing module 630 is configured to control the battery charging circuit of the cleaning device to fail in response to monitoring a second predetermined state after the first predetermined state is monitored, and continue to execute the self-cleaning mode until a self-cleaning completion condition is met, then exits the self-cleaning mode.

For more descriptions about the cleaning device, please refer to FIG. 1, FIG. 2 and their related descriptions, and details may not be repeated herein. Each module in the self-cleaning system 600 may be fully or partially realized by software, hardware, and a combination thereof. The above-mentioned modules may be embedded in or independent of a processor in a computer device in the form of hardware, and may also be stored in a memory of the computer device in the form of software, so that the processor may invoke and execute corresponding operations of the above-mentioned modules.

Figure 7:
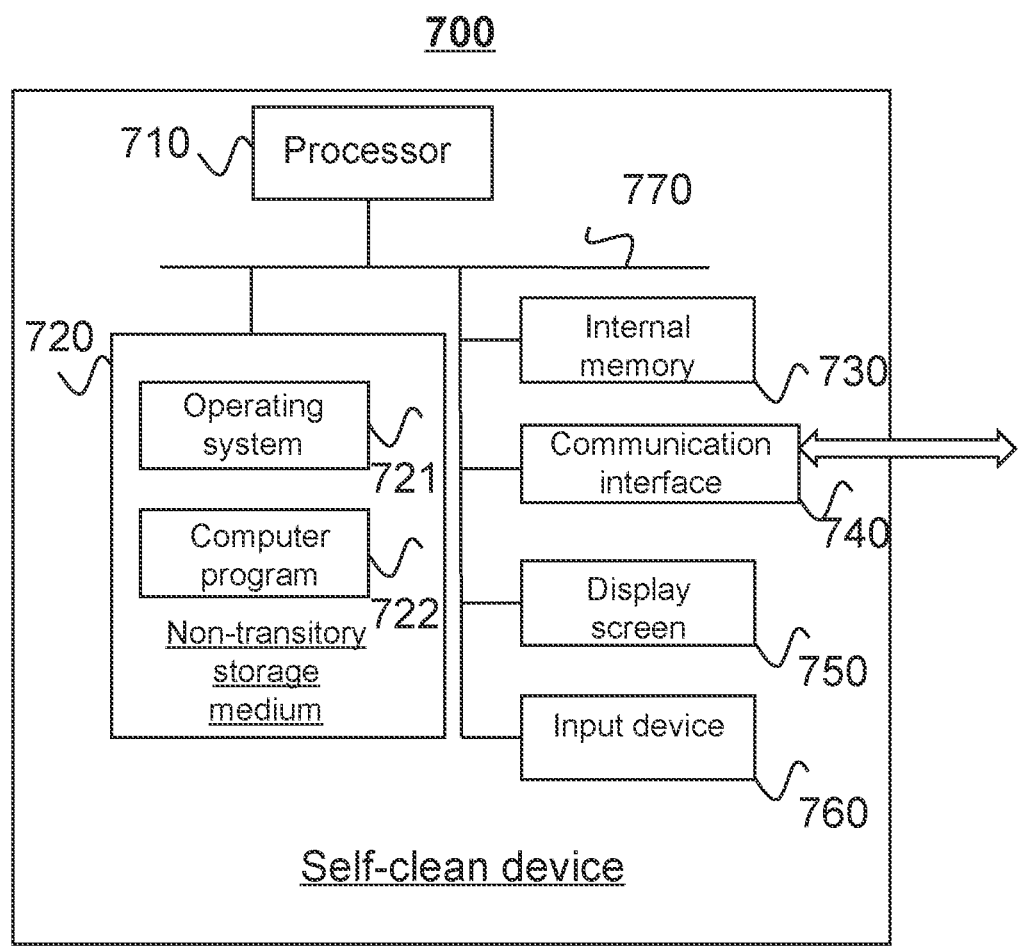
FIG. 7 is a schematic diagram illustrating an exemplary internal structure of a self-cleaning device according to some embodiments of the present disclosure.

Some embodiments of the present disclosure provide a self-cleaning device, and the self-cleaning device may be terminal. FIG. 7 is a schematic diagram illustrating an internal structure of a self-cleaning device according to some embodiments of the present disclosure. As shown in FIG. 7, a self-cleaning device 700 includes a processor 710, a memory, a communication interface 740, a display screen 750, and an input device 760 connected through a main route 770 in a system.

The processor 710 of the self-cleaning device 700 is used to provide computing and control capabilities.

The memory of the self-cleaning device 700 includes a non-transitory storage medium 720 and an internal memory 730. The non-transitory storage medium 720 stores an operating system 721 and a computer program 722. The internal memory 730 provides an environment for an operation of the operating system 721 and the computer program 722 in the non-transitory storage medium 720. When the computer program 722 is executed by the processor 710, a self-cleaning method for the self-cleaning device described in some embodiments of the present disclosure is implemented.

The communication interface 740 of the self-cleaning device 700 is configured for wired or wireless communication with an external terminal. The wireless communication may be realized through WIFI, carrier network, Near Field Communication (NFC), or other technologies.

The display screen 750 of the self-cleaning device 700 may be a liquid crystal display screen or an electronic ink display screen. The input device 760 of the self-cleaning device 700 may be a touch layer covered on the display screen 750, or a button, a trackball, or a touchpad provided on a housing of the self-cleaning device, or an external keyboard, a touchpad or a mouse, etc.

Those skilled in the art may understand that the structure shown in FIG. 7 is only a block diagram of a part of the structure related to the solution of the present disclosure and does not constitute a limitation to the computer equipment on which the solution of the present disclosure applied. The specific computer equipment may include more or fewer components than shown in the figures, or combine some components, or have a different arrangement of components.

Some embodiments of the present disclosure provide a self-cleaning device, including a memory and a processor, and a computer program is stored in the memory. When the processor executes the computer program, following steps are implemented: after receiving a trigger signal of a self-cleaning mode, a cleaning mode is activated, and a battery charging circuit is controlled to fail; during executing the self-cleaning mode, in response to monitoring a first predetermined state, the battery charging circuit is controlled to be effective, so as to charge a rechargeable battery during executing the self-cleaning mode; in response to monitoring a second predetermined state after the first predetermined state is monitored, the battery charging circuit is controlled to fail, and the self-cleaning mode is continued to be executed until a self-cleaning completion condition is met, then exit the self-cleaning mode.

Those of ordinary skill in the art can understand that all or part of the procedures in the methods of the above embodiments can be completed by computer programs, and the computer programs can be stored in a non-volatile computer-readable storage medium, and the methods in the above embodiments can be implemented when the computer programs are executed. Any reference to memory, storage, database, or other media used in the various embodiments provided in the present disclosure may include at least one of non-volatile memory or volatile memory. The non-volatile memory may include read-only memory (ROM), magnetic tape, floppy disk, flash memory, or optical memory, among others. The volatile memory may include random access memory (RAM) or external cache memory. As an illustration and not a limitation, the RAM may be in various forms, such as static random access memory (SRAM) or dynamic random access memory (DRAM).

When the operations executed are described step by step in the embodiments of the present disclosure, unless otherwise specified, the order of the steps can be changed and omitted, and other steps can also be included in the operation process.

The embodiments in the present disclosure are only for illustration and description and do not limit the scope of application of the present disclosure. For those skilled in the art, various modifications and changes that can be made under the guidance of the present disclosure are still within the scope of the present disclosure. Certain features, structures, or characteristics in one or more embodiments of the present disclosure may be properly combined. For the sake of concise description, all possible combinations of the technical features in the above embodiments are not described. However, as long as there is no contradiction in the combination of these technical features, they should be considered as within the scope of the present disclosure.

What is claimed is:

1. A cleaning system, comprising a cleaning device and a base station, wherein:

the base station, when docked with the cleaning device, is used to control the cleaning device for self-cleaning and charging a rechargeable battery; the base station includes a water storage tank and a dirt storage tank, and when the cleaning device is docked with the base station, the water storage tank is used to provide a cleaning liquid for a clean water tank, when the cleaning device is docked with the base station, the dirt storage tank is used to store dirt in a sewage tank;

the cleaning device includes:

the clean water tank, for storing the cleaning liquid;

a water pump, provided on a liquid supply path for pumping the cleaning liquid of the clean water tank out;

the sewage tank, for storing dirt;

a suction drive module, for providing a suction force for sucking the dirt into the sewage tank;

the rechargeable battery, for powering the water pump as well as the suction drive module;

a battery charging circuit, electrically connected to the rechargeable battery for controlling recharging of the rechargeable battery; and a cleaning part, for cleaning an object to be cleaned;

the cleaning system further comprises a trigger control part and a control module, wherein the trigger control part is configured for activating a self-cleaning mode; and the control module is configured for:

activating the self-cleaning mode and controlling the battery charging circuit to fail after receiving a trigger signal from the trigger control part;

in response to monitoring a first predetermined state, controlling the battery charging circuit to be able to charge the rechargeable battery during executing the self-cleaning mode to clean the cleaning part; wherein the first predetermined state includes: the water pump stopping pumping the cleaning liquid out, and the clean water tank is in a lack-of-water state and the sewage tank is in a full-water state;

in response to monitoring a second predetermined state after monitoring the first predetermined state, controlling the battery charging circuit to be able to halt, continuing to execute the self-cleaning mode to clean the cleaning part, and exiting the self-cleaning mode until a self-cleaning completion condition is met; wherein the second predetermined state includes: a first charging parameter meeting a first preset stopping charging condition, and re-determining that the clean water tank is in a no-lack-of-water state or re-determining that the sewage tank is not in the full-water state; executing the self-cleaning mode directly when a user activates the self-cleaning mode without meeting conditions, wherein a remaining power of the rechargeable battery is enough to execute the self-cleaning mode entirely, and the conditions include adding water to the clean water tank and cleaning the sewage tank; and wherein the self-cleaning mode includes: M times of a sub-self-cleaning mode; the control module is configured to execute the M times of the sub-self-cleaning mode; M being an integer greater than or equal to 1;

the control module is further configured for:

if the clean water tank is in the lack-of-water state, turning on a liquid path between the water storage tank and the clean water tank during executing the self-cleaning mode to provide the cleaning liquid for the water storage tank; and if the sewage tank is in the full-water state, turning on a liquid path between the sewage tank and the dirt storage tank during executing the self-cleaning mode to extract the dirt into the dirt storage tank.

2. The cleaning system of claim 1, wherein the cleaning liquid pumped out by the water pump acts on the cleaning part; and when executing the sub-self-cleaning mode, the control module is configured for:

controlling the water pump to pump the cleaning liquid out;

controlling the water pump to stop pumping the cleaning liquid out when a preset stop injection condition is met;

controlling an operation of the suction drive module to suck dirt passing through the cleaning part into the sewage tank;

controlling the suction drive module to stop working when a preset stop suction condition is met; and recording current execution times of the sub-self-cleaning mode.

3. The cleaning system of claim 2, wherein the control module is configured for:

controlling the water pump to stop pumping the cleaning liquid out when a pump liquid volume of the water pump reaches a preset pump liquid volume; or controlling the water pump to stop pumping the cleaning liquid out when a pumping duration of the water pump reaches a preset pumping duration; or controlling the water pump to stop pumping the cleaning liquid out when a humidity of the cleaning part reaches a first preset humidity.

4. The cleaning system of claim 2, wherein when executing the sub-self-cleaning mode, the control module is configured for:

controlling the cleaning part to rotate; and controlling the cleaning part to stop rotating when the suction drive module stops working.

5. The cleaning system of claim 2, wherein the control module is configured for:

controlling the suction drive module to stop working when an actual suction duration of the suction drive module reaches a preset stop suction duration; or controlling the suction drive module to stop working when a humidity of the cleaning part is less than a second preset humidity.

6. The cleaning system of claim 1, wherein the first predetermined state further includes: executing a Nth sub-self-cleaning mode and the water pump stopping pumping the cleaning liquid out; and the second predetermined state further includes the first charging parameter meeting the first preset stop charging condition; wherein N is a positive integer less than or equal to M.

7. The cleaning system of claim 1, wherein the first predetermined state further includes that the clean water tank is in a lack-of-water state, execution times of the sub-self-cleaning mode reaches X times and the clean water tank has not been in a lack-of-water state during the execution times of the sub-self-cleaning mode, and X is a positive integer less than or equal to M; and the second predetermined state further includes: re-determining that the clean water tank is in a no-lack-of-water state or a first charging parameter meets a first preset stop charging condition; or the first predetermined state further includes: the sewage tank is in a full-water state, the execution times of the sub-self-cleaning mode reach X times, and the sewage tank has not been in the full-water state during the execution times of the sub-self-cleaning mode, and X is a positive integer less than or equal to M; and the second predetermined state further includes: re-determining that the sewage tank is not in the full-water state or the first charging parameter meets a first preset stop charging condition; or the first predetermined state further includes: the clean water tank is in the lack-of-water state, the sewage tank is in the full-water state, the execution times of the sub-self-cleaning mode reaches X times, the clean water tank has not been in the lack-of-water state or the sewage tank has not been in the full-water state, and X is the positive integer less than or equal to M; and the second predetermined state further includes: re-determining that the clean water tank is in the no-lack-of-water state, re-determining that the sewage tank is not in the full-water state, or the first charging parameter meets the first preset stop charging condition.

8. The cleaning system of claim 1, wherein the first predetermined state further includes: during a Yth sub-self-cleaning, when the water pump stops pumping the cleaning liquid out, judging that the clear water tank has not been in a lack-of-water state or the sewage tank has not been in a full-water state before the water pump stopping pumping the cleaning liquid out, and Y is a positive integer less than or equal to M; and the second predetermined state further includes: a first charging parameter meeting a first preset stop charging condition.

9. The cleaning system of claim 1, wherein the control module is configured for:

exiting the self-cleaning mode when the M times of the sub-self-cleaning mode have been executed; or exiting the self-cleaning mode when a dirt degree of the cleaning part is lower than a preset dirt degree.

10. The cleaning system of claim 1, wherein the first predetermined state further includes: a remaining power of the rechargeable battery being less than a preset remaining power; and the second predetermined state further includes: a second charging parameter meeting a second preset stop charging condition.

11. The cleaning system of claim 1, wherein a turbidity sensor is provided at an inlet of the sewage tank, and the turbidity sensor is used to detect turbidity data of dirt sucked into the sewage tank;

the control module is further configured for:

determining an initial dirt feature of the cleaning device based on an initial turbidity data sequence detected by the turbidity sensor;

determining the M times of sub-self-cleaning mode based on the initial dirt feature;

determining a turbidity detection cycle based on the initial dirt feature; and adjusting the M times of the sub-self-cleaning mode based on a subsequent turbidity data sequence obtained during the turbidity detection cycle.

12. The cleaning system of claim 11, wherein the processor is configured for:

determining the turbidity detection cycle based on the initial dirt feature; and adjusting the times M of the sub-self-cleaning mode based on a subsequent turbidity data sequence obtained during the turbidity detection cycle, wherein the subsequent turbidity data sequence includes turbidity data of dirt sucked into the sewage tank during each sub-self-cleaning in the turbidity detection cycle.

13. The cleaning system of claim 12, wherein the processor is configured for:

determining an updated dirt feature based on the subsequent turbidity data sequence;

determining single cleaning effect of subsequent sub-self-cleaning based on the initial dirt feature and the updated dirt feature; and adjusting the times M of the sub-self-cleaning mode based on the single cleaning effect and the updated dirt feature.

14. The cleaning system of claim 13, wherein the control module is configured for:

determining remaining times through a times determination model, the times determination model include a data processing layer and a times determination layer, wherein:

an input of the data processing layer includes a total sequence of turbidity data and an output of the data processing layer includes a turbidity change feature;

an input of the times determination layer includes the turbidity change feature and latest turbidity data, and an output of the times determination layer includes the remaining times of the sub-self-cleaning mode.

15. The cleaning system of claim 1, wherein the control module is configured for:

determining a single water supply volume of the clean water tank in each sub-self-cleaning mode based on the dirt feature and the M times of the sub-self-cleaning mode.

16. A self-cleaning method for a cleaning device, wherein the cleaning device includes: a cleaning part, a clean water tank, a water pump, a sewage tank, a suction drive module, a rechargeable battery, a control module, and a battery charging circuit, and the cleaning part is configured for cleaning an object to be cleaned; the clean water tank is used to store a cleaning liquid; the water pump is provided on a liquid supply path for pumping the cleaning liquid of the clean water tank out; the sewage tank is used to store dirt; the suction drive module is configured to provide a suction force for sucking the dirt into the sewage tank; the rechargeable battery is used to power the water pump and the suction drive module; and the battery charging circuit is electrically connected to the rechargeable battery for controlling recharging of the rechargeable battery;

the base station is used to control the cleaning device for self-cleaning and charging the rechargeable battery when the cleaning device is docked with the base station; and the self-cleaning method is implemented on the control module, which includes:

activating a self-cleaning mode and controlling the battery charging circuit to fail after receiving a trigger signal from a trigger control part;

in response to monitoring a first predetermined state, controlling the battery charging circuit to be able to charge the rechargeable battery during executing the self-cleaning mode to clean the cleaning part; wherein the first predetermined state includes: the water pump stopping pumping the cleaning liquid out, and the clean water tank is in a lack-of-water state and the sewage tank is in a full-water state; and in response to monitoring a second predetermined state after monitoring the first predetermined state, controlling the battery charging circuit to be able to halt, continuing to execute the self-cleaning mode to clean the cleaning part; and exiting the self-cleaning mode until a self-cleaning completion condition is met; wherein the second predetermined state includes: a first charging parameter meeting a first preset stopping charging condition, and re-determining that the clean water tank is in a no-lack-of-water state or re-determining that the sewage tank is not in the full-water state; executing the self-cleaning mode directly when a user activates the self-cleaning mode without meeting conditions, wherein a remaining power of the rechargeable battery is enough to execute the self-cleaning mode entirely, and the conditions include adding water to the clean water tank and cleaning the sewage tank; and wherein the self-cleaning mode includes: M times of a sub-self-cleaning mode; the control module is configured to execute the M times of the sub-self-cleaning mode; M being an integer greater than or equal to 1;

wherein the base station includes a water storage tank and a dirt storage tank, and when the cleaning device is docked with the base station, the water storage tank is used to provide the cleaning liquid for the clean water tank, when the cleaning device is docked with the base station, the dirt storage tank is used to store dirt in the sewage tank; and the self-cleaning method further includes:

if the clean water tank is in the lack-of-water state, turning on a liquid path between the water storage tank and the clean water tank during executing the self-cleaning mode to provide the cleaning liquid for the water storage tank; and if the sewage tank is in the full-water state, turning on a liquid path between the sewage tank and the dirt storage tank during executing the self-cleaning mode to extract the dirt into the dirt storage tank.

\* \* \* \* \*